April 18, 1967 A. A. THIELE 3,315,135
SILICON CONTROLLED RECTIFIER ACTUATED LIQUID GAS FILLER
Filed Nov. 1, 1965
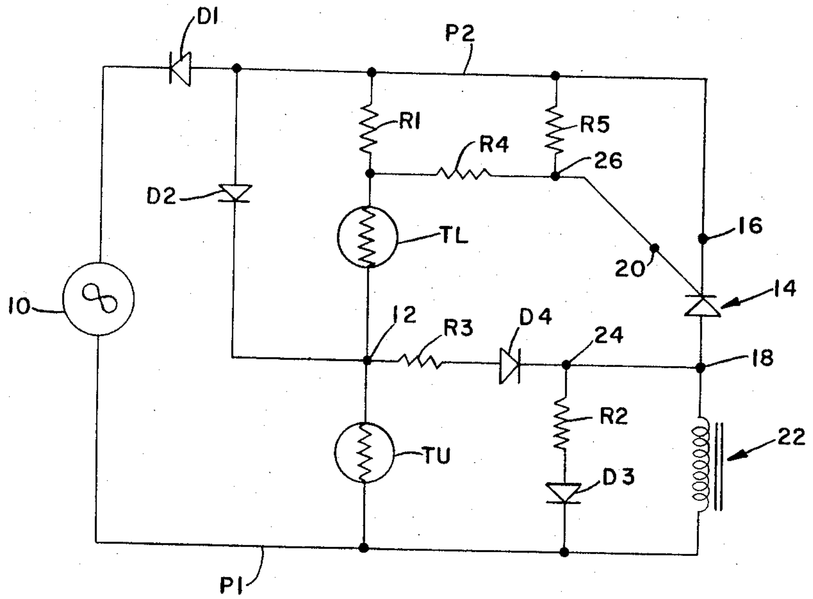
INVENTOR
Alfred A. Thiele
BY Birch and Birch
ATTORNEYS 3,315,135

SILICON CONTROLLED RECTIFIER ACTUATED LIQUID GAS FILLER

Alfred A. Thiele, 50 S. Munn Ave., Apt. 519, East Orange, N.J. 07018

Filed Nov. 1, 1965, Ser. No. 505,830
9 Claims. (Cl. 317—148.5)

This invention relates to automatic filler systems for liquid gases and the like, such as liquid nitrogen, and more particularly to intermittent automatic filler systems which regulate the level of liquid gas in a particular receptacle.

This application is a continuation-in-part of my copending application Ser. No. 311,902 for "Silicon Controlled Rectifier Actuated Liquid Gas Filler," filed Sept. 27, 1963, and has become Patent No. 3,222,578.

It is an object of this invention to provide a novel intermittent automatic filler system for liquid gas and the like.

It is another object of this invention to provide a novel intermittent automatic filler system for liquid gas and the like characterized by small size and simplicity.

Another object of this invention is to provide a novel intermittent automatic filler for liquid gas and the like which maintains the level of liquid gas in a receptacle between predetermined limits.

Still another object of this invention is to provide a novel intermittent automatic filler for liquid gas and the like having a novel silicon controlled rectifier circuit and a filler valve controlled thereby.

Yet another object of this invention is to provide a new and novel intermittent automatic filler control means for liquid gas and the like having a new and novel multiple thermistor circuit configuration which provides optimally minimum power consumption, precludes high frequency cycling of the filler control means, and provides novel self-preheating means in the thermistor circuit portion of the said filler control means.

These and other objects of the invention will become more fully apparent with reference to the following specification and drawings which relate to a preferred embodiment of the invention.

In the drawings:

FIGURE 1 is a schematic of a liquid gas filler control means of the present invention.

Referring in detail to the drawings, and more particularly to FIGURE 1, the filler control means of the present invention is shown as including an alternating current source 10 connected on one side to a first power lead P1 and on the other side through a half wave rectifying diode D1 to a second power lead P2, the latter being the common or return power lead.

A first branch circuit is connected between the power leads P1 and P2 and comprises first and second thermistor means TU and TL adapted, respectively, to sense the presence of upper and lower limit levels of liquid gas in a suitable container holding said thermistors and said liquid gas, said lead being controlled by the filler system as fully disclosed in my above-referenced copending application, said first and second thermistor means being connected in series and having a common junction 12 therebetween, the said second thermistor TL being connected from said junction 12 through a current limiting, series first resistance R1 to the second power lead P2 and said second thermistor TL and said resistance R1 being shunted by a second diode D2. The second diode D2 is connected at its cathode to the common junction 12 and at its anode to the second power lead P2.

A second branch circuit is connected between the power leads P1 and P2 comprising a silicon controlled rectifier 14, hereinafter referred to as SCR14, having cathode, anode and gate terminals 16, 18 and 20, respectively, connected via its cathode terminal 16 to the second power lead P2 and connected from its anode terminal 18 through a solenoid winding 22 to the first power lead P1, whereby, the said solenoid winding 22 and the anode-cathode path of the SCR14 are connected in series across the said power leads P1 and P2.

The solenoid winding 22 is shunted by a second resistance R2 in series with a third diode D3 connected from a second circuit junction 24 common with the anode terminal 18 of the SCR14 to the first power lead P1, the cathode of the said third diode D3 being connected at the said first power lead P1. The first and second circuit junctions 12 and 24, respectively, are interconnected by a series connected third resistance R3 and fourth diode D4, the cathode of the latter being connected at the second circuit junction 24.

A biasing circuit for the SCR14 is provided in shunt with the first resistance R1 and comprises a voltage divider having fourth and fifth resistances R4 and R5, connected in series across the said first resistance R1 and having a common circuit node 26 therebetween. The common node 26 is directly connected with the gate terminal 20 of the SCR14 to complete the circuit comprising the filler control means of the present invention.

*Operation*

With further reference to FIGURE 1, assuming that the upper and lower thermistors TU and TL, respectively, are both immersed in liquid gas, the resistance of both said thermistors is maximized and the voltage drop across the first resistance R1 is minimized, resulting in a minimized voltage at the circuit node 26. Thus, when both thermistors are immersed in liquid gas, the filler control means is satisfied and the bias applied to the gate terminal 20 of the SCR14 is insufficient to render the SCR14 conductive.

Should the liquid gas level being monitored by the two thermistors TU and TL drop below the upper thermistor TU, placing same in a state of lower heat dissipation, the first resistance R1 and the high resistance state of the lower thermistor TL provide a sufficiently high series resistance to prevent the voltage drop across the said first resistance R1 from increasing to a magnitude at which the gate biasing potential at the circuit node 26 is sufficient to render the SCR14 conductive.

However, should the liquid gas level being monitored fall below the lower thermistor TL, then both of the thermistors TU and TL will be capable of achieving their low resistance states. Accordingly, the flow of current serially through the upper and lower thermistors TU and TL, the first resistance R1 and the fourth and fifth resistances R4 and R5 results in a rapid or runaway action in the thermistors TU and TL with respect to the resistance values thereof, effecting a preheating of the upper thermistor TU in response to increased conductivity in the lower thermistor TL.

The increased current flow through the thermistors TU and TL results in an increased voltage drop across the first resistance R1 and a corresponding increase in bias potential at the circuit node 26 and gate terminal 20, causing the SCR14 to conduct and energize the solenoid winding 22. Thus a liquid gas filling cycle is initiated by a suitable solenoid valve means or the like as fully disclosed in my above-referenced copending application.

During alternate half-cycles of the source 10 which are blocked by the rectifying first diode D1, the SCR14 is maintained in the conductive state by the voltage induced in the solenoid winding 22 as a result of the inductive memory of the latter. Thus, a holding current path is established through the anode 18 and cathode 16 of the SCR14, power lead P2, second diode D2, upper thermistor TU power lead P1, the said solenoid winding 22 temporarily acting as a source.

Thus, the importance of the preheating effect of the lower thermistor TL on the upper thermistor TU becomes readily apparent, since, unless the upper thermistor TU is maintained in a low resistance state until the liquid gas level rises to submerge same, there will be too high a resistance in the above-defined holding current path to maintain the SCR14 conductive and the filling cycle will terminate prematurely. Of course, once the upper thermistor TU becomes submerged in liquid gas, the high resistance state thereof will be achieved and the SCR14 will be rendered non-conductive on the next half-cycle of proper polarity from the source 10.

The serial connection of the upper and lower thermistors TU and TL also minimizes the power drain on the source 10 when the system is in a quiescent state, i.e., when the liquid gas level is at the upper limit or between the upper and lower limits thereof.

As can be readily seen from the foregoing specification and drawings, this invention provides a new and novel filler control system which minimizes power drain in the quiescent state thereof, precludes premature termination of filling cycles, and minimizes the number of circuit components required to effect a filler control function.

It is to be understood that the particular embodiment of this invention shown and described herein is exemplary and is not intended to limit the scope of the appended claims.

I claim:

1. In a means for maintaining the level of a liquid in a container between upper and lower limits including solenoid means for selectively effecting a supply of liquid to said container, a control circuit for said solenoid means comprising a solenoid winding for said solenoid means, a power source, a first thermistor positioned at said upper limit and a second thermistor positioned at said lower limit in said container, said thermistors being connected in series across said source, silicon controlled rectifier means controlling said solenoid means and connected in circuit with said solenoid winding across said power source, bias means controlled by and including said first and second thermistors in circuit with said power source and with said controlled rectifier means firing said controlled rectifier means when the level of said liquid is below said lower limit, and holding means including said first thermistor and said solenoid winding maintaining said controlled rectifier means on when the level of said liquid is between said upper and lower limits, subsequent to the firing of said controlled rectifier means.

2. The invention defined in claim 1, wherein said silicon controlled rectifier means includes anode, cathode and gate terminals; and wherein said holding means further includes the anode-cathode conducting path of said controlled rectifier means and unidirectional conducting means in series with said first thermistor and in shunt with said second thermistor.

3. The invention defined in claim 1, wherein said silicon controlled rectifier means includes anode, cathode and gate terminals; and wherein said bias means includes voltage divider means in series with said first and second thermistors and including an intermediate circuit node connected in circuit with said gate terminal of said controlled rectifier means.

4. The invention defined in claim 1, wherein said silicon controlled rectifier means includes, anode, cathode and gate terminals; wherein said bias means includes voltage divider means in series with said first and second thermistors and including an intermediate circuit node connected in circuit with said gate terminal of said controlled rectifier means; and wherein said holding means further includes the anode-cathode conducting path of said controlled rectifier means and unidirectional conducting means in series with said first thermistor and in shunt with said second thermistor.

5. Means selectively energizing and de-energizing a solenoid winding in response to first and second predetermined conditions, respectively, comprising a solenoid winding; a power source; first and second series connected non-linear resistance means connected across said power source jointly responsive to said first condition and said first non-linear resistance means being responsive to said second condition, said non-linear resistance means effecting, respectively, non-linear resistance changes upon the occurrence of the respective said conditions; silicon controlled rectifier means connected in series with said solenoid winding across said power source and including a gate terminal; bias means controlled by and including said non-linear resistance means in circuit with said power source and with said gate terminal firing said controlled rectifier means in response to said first predetermined condition to energize said solenoid winding; and holding means controlled by and including said first non-linear resistance means and said solenoid winding maintaining said controlled rectifier means on subsequent to the occurrence of said first condition and prior to the occurrence of said second condition.

6. The invention defined in claim 5, wherein said silicon controlled rectifier means further includes anode and cathode terminals; and wherein said holding means further includes the anode-cathode conducting path of said controlled rectifier means and unidirectional conducting means in series with said first and in shunt with said second non-linear resistance means.

7. The invention defined in claim 5, wherein said silicon controlled rectifier means further includes anode and cathode terminals; and wherein said bias means includes voltage divider means in series with said first and second non-linear resistance means and including an intermediate circuit node connected in circuit with said gate terminal of said controlled rectifier means.

8. The invention defined in claim 5, wherein said silicon controlled rectifier means further includes anode and cathode terminals; wherein said bias means includes voltage divider means in series with said first and second non-linear resistance means and including an intermediate circuit node connected in circuit with said gate terminal of said controlled rectifier means; and wherein said holding means further includes the anode-cathode conducting path of said controlled rectifier means and unidirectional conducting means in series with said first and in shunt with said second non-linear resistance means.

9. The invention defined in claim 5, wherein said first and second non-linear resistance means comprise, respectively, first and second thermistor means.

References Cited by the Examiner

UNITED STATES PATENTS

| | | |
|---|---|---|
| 2,924,234 | 2/1960 | Wilson. |
| 3,206,615 | 9/1965 | La Poine. |
| 3,229,167 | 1/1966 | Goble. |

OTHER REFERENCES

Electronics, Sept. 13, 1963, p. 14.

MILTON O. HIRSHFIELD, *Primary Examiner.*

J. A. SILVERMAN, *Assistant Examiner.*